Figure 1A:
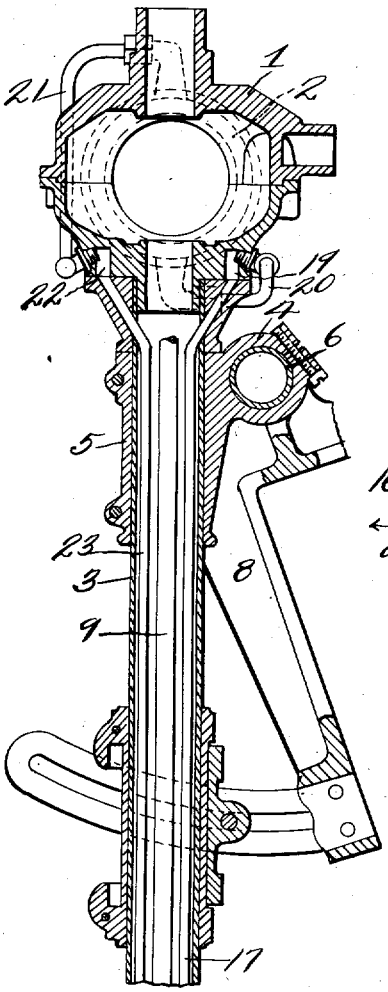

L. J. JOHNSON

July 7, 1931. WATER COOLING SYSTEM FOR OUTBOARD MOTORS Re. 18,120

Filed Feb. 9, 1924

Louis J. Johnson
INVENTOR.

BY George J. Utsch

ATTORNEY.

Reissued July 7, 1931

Re. 18,120

UNITED STATES PATENT OFFICE

LOUIS J. JOHNSON, OF SOUTH BEND, INDIANA, ASSIGNOR TO JOHNSON BROS. ENGINEERING CORPORATION, OF SOUTH BEND, INDIANA

WATER-COOLING SYSTEM FOR OUTBOARD MOTORS

Original No. 1,567,512, dated December 29, 1925, Serial No. 691,601, filed February 9, 1924. Application for reissue filed September 7, 1927. Serial No. 218,091.

My invention relates to improvements in water circulating systems for outboard motors. Heretofore, outboard motors have been provided with plunger pumps for forcing cooling water through the engine jacket but experience has shown that such water circulating devices have been open to the following objections: first, that at high speeds, due to excessive wear, then soon got out of repair, and secondly, due to the presence of sand, sediment, and other foreign matter in the water, the pump filled with grit and dirt and became clogged and was a continuous source of trouble. One of the objects of my present invention is to provide a water circulating means having a water inlet below the water level and constructed and arranged to effectively feed water to the water jacket of the engine during the movement of the boat through the water and irrespective of the direction of travel of the boat, either forwardly or backwardly or in any steered position and which water circulating means will not get out of repair and will not become clogged and which is simple in installation and economical in manufacture and assembly.

Another object of my invention resides in providing an outboard motor construction of the type wherein the propeller-carrying-support is shiftable about a substantially vertical axis for steering or reversing the direction and travel of the boat, and wherein a water gathering mouth is mounted on this propeller-carrying-support and in a position wholly to cause water to be forced upwardly to the water jacket of the engine upon the movement of the boat through the water, the construction and arrangement being such that the water forcing means will be operative in any turned movement of this propeller-carrying-housing.

The invention relates to water cooling systems for outboard motors, and has for its object to provide means whereby the propeller is utilized to force water as it is driven rearwardly by the propeller through the water jacket of the engine. Also to provide means whereby the suction at the forward side of the propeller is utilized for creating a suction, and materially speeding up the circulation of water in the system, as it is forced through the system by the water projected from the rear side of the propeller.

A further object is to provide a cooling system for outboard motors comprising an intake pipe and a discharge pipe, said pipes having their intake and discharge ends at opposite sides of the propeller, where the blades, during the rotation of the propeller, will pass between the intake and discharge ends of the pipes, and force water through the intake end and simultaneously suck water from the discharge end of the pipe.

A further object is to provide in combination with an outboard motor, pivotally and rotatably mounted, a water cooling system, through which water is forced and driven by the propeller blades, and sucked from the system by the propeller blades, and comprising intake and discharge ports, disposed in a bracket, means whereby said bracket is rigidly mounted, and held in position in relation to the propeller blades, and movable upon the pivotal or rotatable movement of the motor as a whole.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
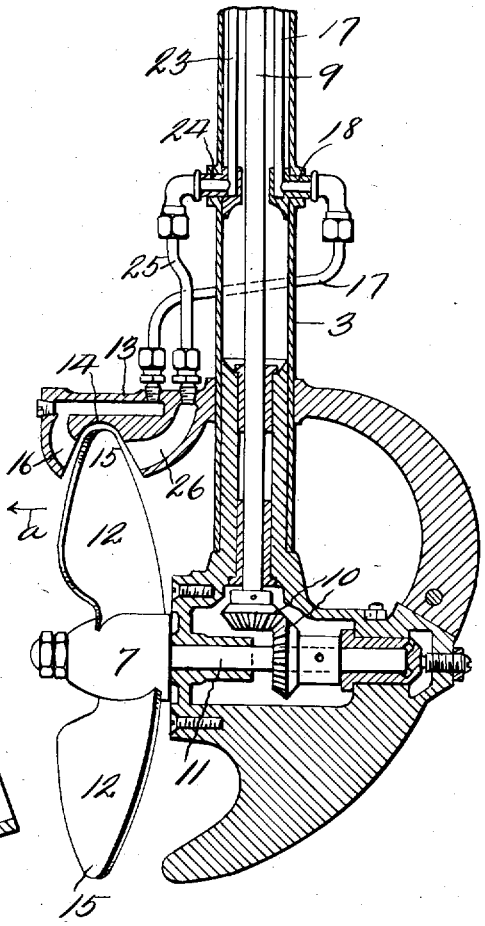

Figure 1 is a vertical longitudinal sectional view through the lower portion of the outboard motor, showing the device applied thereto.

Figure 1*a* is a vertical longitudinal sectional view through the upper portion of the outboard motor.

Referring to the drawings, the numeral 1 designates the engine casing, and 2 the water jacket thereof. The outboard motor, generally is of substantially the same type as that set forth in Patent No. 1,467,641, issued to Louis J. Johnson, Sept. 11, 1923. Extending downwardly from the engine casing 1 is a shaft casing 3, which casing is supported by a bracket 4 having a sleeve 5. The bracket 4 is pivotally mounted at 6 for movement in a vertical longitudinal plane, and the shaft casing 3 is rotatably mounted in the sleeve 5, therefore it will be seen that the motor may be moved in a vertical plane longitudinally, and rotated in a horizontal plane as desired for changing the angle of the axis of the propeller 7 for directional steering of a boat, to which the motor is attached by means of the bracket 8. Extending downwardly through the shaft casing 3 is a drive shaft 9, the lower end of which has gear connections 10 with the propeller drive shaft 11, for rotating the propeller. Heretofore pumps have been placed on outboard motors adjacent the lower ends thereof which have been driven in various ways mechanically, for instance as shown in the patent above referred to. To obviate the use of a mechanically operated pump, and utilize the water forced rearwardly in the direction of the arrow *a* from the propeller blades 12, a bracket 13 is provided, which bracket is carried by the drive shaft casing 3, which bracket moves with the casing during the directional steering of the boat, and during the pivotal movement of the motor as a whole, therefore it will be seen that the bracket 13 will be maintained in relative relation to the propeller blades 12 at all times during the operation of the motor. Bracket 13 is provided on its under side with a recess 14 through which the outer ends 15 of the propeller blades pass during the rotation of the propeller, and consequently as water is thrust rearwardly in the direction of the arrow *a* from the propeller, a portion thereof will be forced through the upwardly and rearwardly curved intake port 16 of the bracket 13, and thence through the intake pipe 17, which extends through and into the drive shaft casing 3 at 18. The upper end of the pipe 17 discharges into the port 19 of the engine casing 1, and the water passes therefrom through the pipe 20, into the water jacket 2, and passes through said water jacket and is discharged through the discharge pipe 21 into the port 22, and thence through the discharge pipe 23, which extends downwardly through the drive shaft casing 3, and through the drive shaft casing at 24, from which point the water passes through the pipe 25, and discharges into the downwardly and rearwardly curved discharge port 26 of the bracket 13, rearwardly of the propeller blades 12. However during the rotation of the propeller, it will be seen, as water is thrust by the propeller blades into the port 16, a suction is created at the rear sides of the blades 12, which suction will suck water from the discharge port 26, and thereby the material speeding up of the circulation of water is accomplished. It will be seen that no matter in what direction the motor is moved in its pivotal movement, the bracket 14 will move therewith, and consequently the intake port 16, and the discharge port 26 will be maintained in relative position to the outer ends of the propeller blades 12, thereby insuring a positive operation of the device at all times, and eliminating the use of any flexible connections.

From the above it will be seen that a water cooling system is provided, which is particularly adapted for use in connection with outboard motors wherein the thrust of water from the propeller is utilized as a circulating medium through the engine for cooling purposes, and the circulation is materially increased in speed by suction adjacent the discharge end of the system, and located rearwardly of the propeller.

The invention having been set forth what is claimed as new and useful is:—

1. The combination with an outboard motor having a water jacket, a drive shaft casing, a bladed propeller, a bracket carried by said casing and provided with a recess through which the ends of the propeller blades move, intake and discharge pipes connected to the water jacket and the bracket in registration with intake and discharge ports located respectively rearwardly and forwardly of the ends of the propeller blades.

2. The combination with a pivotally mounted outboard motor having a water jacket and a propeller, of a bracket carried by and movable with said motor and arching the propeller and provided with intake and discharge ports, and pipe connections between the intake and discharge port and the water jacket.

3. The combination of an outboard motor having a water jacket, a propeller having a driving connection with said motor, means permitting said propeller to be turned angularly about a substantially vertical axis, and a water circulating means for said jacket including a bracket turnable with the propeller when the latter is turned about the substantially vertical axis, said bracket being located directly above the path of travel of the propeller blades, said bracket having a water gathering mouth connected with the water jacket of the engine and located so that during the revolution of the propeller blades the latter will force water into the water gathering mouth and to the water jacket.

4. The combination with an outboard motor having a water jacket, a propeller having connection with said motor, means permitting said propeller to be turned about a substantially vertical axis, and a member turnable with the propeller when the latter turns about its substantially vertical axis, said member being located immediately above the path of travel of the propeller blades and said member having two mouths, each connected to the water jacket of the engine, said mouths being spaced apart and lying on opposite sides of the path of travel of the propeller blades and relatively close to the propeller blades as they revolve.

5. In an outboard motor, the combination of a motor having a water jacket and a depending drive shaft, a propeller-carrying-housing turnable about the axis of the drive shaft, a propeller carried by said housing and driven by said shaft, said propeller-carrying-housing having a bracket over-lying the path of travel of the propeller blades, said bracket having a water gathering mouth thereon and connected to the water jacket of the engine, said mouth being disposed so that the propeller blades during their revolution will force water into said mouth and to the water jacket.

6. In an outboard motor, the combination of a motor having a water jacket and a substantially vertically depending drive shaft, a propeller carrying housing turnable about the axis of the drive shaft, a propeller carried by said housing and driven by said shaft, said propeller carrying housing having a rearwardly extending portion lying transversely of the path of travel of the propeller blades and adjacent thereto, said rearwardly extending portion having a water gathering mouth thereon and connected to the water jacket of the engine, said mouth being disposed so that the propeller blades during their revolution will force water into said mouth and to the water jacket.

7. In combination with an outboard motor having a water jacketed cylinder and a substantially vertically depending drive shaft, of a bracket adapted to be attached to a boat or the like, a substantially vertically depending sleeve surrounding said vertically depending drive shaft, and means to permit said sleeve to turn about the drive shaft as an axis, a housing rigidly carried by the lower portion of said sleeve, an angularly disposed propeller shaft mounted on said housing and having geared connections with the lower portion of said drive shaft, a propeller on said propeller shaft, and water circulating means for the jacket of the engine including the propeller as an element said means including a duct, located below the normal water level, said duct being internally of the housing whereby arranged to shift with the propeller as the latter is turned about the drive shaft as an axis so as to insure constant circulation in all shifted positions of the propeller.

8. The combination with an outboard motor having a water jacket and provided with a substantially vertically depending drive shaft, of a bracket adapted to be attached to a boat or the like, a sleeve surrounding said drive shaft, means for pivotally mounting said sleeve on said bracket whereby said sleeve may swing about a horizontal axis for tilting movement, and means for turnably mounting said sleeve in said bracket about the drive shaft as an axis for a steering movement, a propeller carrying housing rigidly carried on the lower end of said sleeve, a propeller shaft mounted in said housing and having driving connections with the lower end of said drive shaft, a propeller on said propeller shaft, and a duct on said housing communicating with the water jacket, said duct being arranged relatively close to the path of travel of the outer portion of the rotating propeller blades, said port being shiftable in unison with the movement of the propeller about the vertical axis of the drive shaft whereby to render the effect of the propeller on the flow through the duct substantially constant for all positions of the propeller.

9. The combination with an outboard motor having a water jacket and provided with a substantially vertically depending drive shaft, of a bracket adapted to be attached to a boat or the like, a sleeve surrounding said drive shaft, means for pivotally mounting said sleeve on said bracket whereby said sleeve may swing about a horizontal axis for tilting movement, and means for turnably mounting said sleeve in said bracket about the drive shaft as an axis for a steering movement, a propeller carrying housing rigidly carried on the lower end of said sleeve, a propeller shaft mounted in said housing and having driving connections with the lower end of said drive shaft, a propeller on said propeller shaft, and ducts formed in said housing and leading to and from the water jacket, said ducts terminating in ports located below the normal water level and movable with the housing, one of said ducts being associated with the propeller whereby to cause the circulation of water through the engine jacket, and being shiftable with the propeller about the vertical axis of the drive shaft whereby the effect of the propeller on the water flow is substantially constant for all positions of the propeller.

10. In combination with an outboard motor having a water jacketed cylinder and a substantially vertically depending drive shaft, of a bracket adapted to be attached to a boat or the like, a substantially vertically depending sleeve surrounding said vertically depending drive shaft, means interconnecting said bracket and sleeve so as to permit said sleeve to tilt on said bracket about a horizontal axis, and means to permit said sleeve to turn about the drive shaft as an axis, a housing rigidly carried by the lower portion of said sleeve, an angularly disposed propeller shaft mounted on said housing and having geared connections with the lower portion of said drive shaft, a propeller on said propeller shaft, and means on said housing extending rearwardly from and directly overlying the path of travel of the propeller blades, said means depending downwardly at the rear of the path of travel of the propeller blades and provided with a water receiving mouth disposed relatively close to the path of travel of said propeller blades and adapted to receive water from the rotating propeller, said water receiving mouth being turnable with the propeller in the shifting movement of the housing about the vertically disposed drive shaft whereby to permit the propeller to force a uniformly constant flow of water to the water jacket in its various shifted positions.

11. In combination with an outboard motor having a water jacketed cylinder and a substantially vertically depending drive shaft, of a bracket adapted to be attached to a boat or the like, a substantially vertically depending sleeve surrounding said vertically depending drive shaft, means interconnecting said bracket and sleeve so as to permit said sleeve to tilt on said bracket about a horizontal axis, and means to permit said sleeve to turn about the drive shaft as an axis, a housing rigidly carried by the lower portion of said sleeve, an angularly disposed propeller shaft mounted on said housing and having geared connections with the lower portion of said drive shaft, a propeller on said propeller shaft, and means forming a duct leading to said water jacket and having a port formed in said housing, said port being arranged constantly to face forwardly as the housing moves through the water whereby a flow will be induced in said duct in various shifted positions of the housing as it is turned about the drive shaft as an axis.

12. In a conventional outboard motor construction of the water jacketed type including a vertically disposed housing adapted to be immersed in the water, said housing having a vertically disposed bore and a horizontally disposed bore, a substantially vertically disposed power drive shaft in the vertically disposed bore and a propeller shaft disposed at right angles to the drive shaft and located in the horizontally disposed bore, gearing connections enclosed by said housing operatively connecting said shafts, said housing enclosing water intake and discharge passages connecting both with the water jacket and with the body of water in which the housing is immersed, one of said water passages having its terminal operatively associated with the propeller and constructed and arranged so that upon rotation of the propeller, the latter forms a positive actuating element for effecting circulation of the water through said passage.

13. In a conventional outboard motor construction of the water jacketed type including a vertically disposed housing having a vertical bore and a horizontal bore, a substantially vertically disposed drive shaft in said vertical bore and an angularly disposed propeller shaft in said horizontal bore, gearing connections enclosed by said housing and connecting said shafts, said housing enclosing water inlet and discharge passages, said passages connecting with the water jacket of the engine, the inlet passage being disposed below normal water level and facing toward the front of the housing so that when the housing moves through the water, the water will tend to flow through said inlet passage, said discharge passage terminating below normal water level and being operatively associated with the propeller so that upon revolution of the latter, said propeller will assist in causing a circulation of water through the discharge passage.

14. In a conventional outboard motor construction of the water jacketed type, and including a vertically disposed housing having vertically and horizontally disposed bores with operatively connected power and propeller shafts disposed respectively therein, said housing enclosing water intake and discharge passages, said discharge passage terminating in an orifice disposed below the normal water level and located forward of and adjacent to the path of travel of the propeller blades, thereby creating suction at said orifice to accellerate the circulation of the cooling water.

15. A water jacketed marine propulsion device provided with a turnable propeller carrying housing, intake and discharge orifices enclosed in said housing, said orifices being below normal water level and connections between the orifices and the water jacket of the engine, the intake orifice facing forwardly of the housing and the discharge orifice facing rearwardly of the housing and a propeller for circulating the cooling water.

16. A water jacketed marine propulsion device provided with turnable propeller carrying housing, intake and discharge orifices enclosed in said housing, said orifices being below normal water level and connections between the orifices and the water jacket of the engine, said orifices facing in opposite directions with respect to said housing, one of said orifices being operatively associated with the rotatable propeller to cause a flow of water through the system.

17. A marine propulsion device comprising a water jacketed motor having a substantially vertically depending drive shaft having a tubular casing surrounding said shaft, means for turning said tubular casing axially about the drive shaft for steering, a housing rigidly connected to said tubular casing and turnable therewith, said housing carrying the propeller and carrying driving connections between said shaft and the propeller, and said housing being internally provided with unobstructed water passages, connections from said passage to the jacket of the motor, said connections passing upwardly within the peripheral surface of the hollow casing, one of said passages terminating in a water inlet orifice opening below normal water level and being constructed and arranged with relation to said turnable casing whereby in any steering position of said housing said inlet orifice will face in such direction that the water will tend to flow thereinto as the housing moves through the water.

18. In a device of the class described, the combination with a water jacketed motor having a vertically depending drive shaft and a surrounding tubular casing, means for turning said tubular casing for steering, a housing rigidly carried by the lower end of the said casing and turnable therewith, said housing enclosing the lower end of said vertical drive shaft, a horizontally disposed propeller shaft mounted within said housing and gearing connections between said shafts, said housing being provided with a water inlet opening facing forwardly thereof into which the water is adapted to be forced by the normal movement of the housing relative to the water in which it is adapted to be submerged, said housing being provided with an opening below normal water level and facing rearwardly of said housing and from which water is induced to flow by the normal movement of the housing through the water, a connection from the motor jacket to the first mentioned opening and a connection from the motor jacket to the second mentioned opening and power driven means for aiding in creating a flow of water to said openings.

19. In combination with an outboard motor having a propeller, vertical and horizontal shafts, and a supporting housing therefor having an extension projecting upwardly above the highest point in the path of travel of the rotating propeller blades and said extension being also elongated in a vertical plane parallel to the axis of the propeller shaft and extending both forwardly and rearwardly of the vertical shaft, and a water circulating system for said motor including a duct located within the confines of the outer walls of said extension, said duct terminating at one end adjacent said propeller whereby the action of said propeller will effect a circulation of water in said system.

20. In combination with an outboard motor having a propeller, vertical and horizontal shafts, and a supporting housing therefor having an extension projecting upwardly above the highest point in the path of travel of the rotating propeller blades and said extension being also elongated in a vertical plane parallel to the axis of the propeller shaft and extending both forwardly and rearwardly of the vertical shaft, and a water circulating system for said motor including means whereby the rotation of said propeller will induce a flow of water through said cooling system, said means including a duct passing through said housing.

21. In combination with an outboard motor having a propeller, vertical and horizontal shafts, and a supporting housing therefor having an extension projecting upwardly above the highest point in the path of travel of the rotating propeller blades and said extension being also elongated in a vertical plane parallel to the axis of the propeller shaft and extending both forwardly and rearwardly of the vertical shaft, and a water circulating system for said motor including a plurality of ducts located within the confines of the outer walls of said extension and connecting with the water jacket of the engine and also opening below normal water level.

22. In combination with an outboard motor having a vertically disposed power shaft housing, a water cooling system therefor including a pair of ducts passing through said housing and having both the inlet opening and the outlet opening thereof positioned below the normal water level on said motor, at least one of said openings being positioned adjacent the path of movement of said propeller whereby to be affected by the rotation of said propeller in water to induce a flow of water therethrough.

23. In combination with an outboard motor having a vertically disposed power shaft housing, a water cooling system therefor including a pair of ducts passing through said housing and having both the inlet opening and the outlet opening thereof positioned below the normal water level on said motor, a propeller, one of said openings being positioned adjacent the path of movement of said propeller whereby to be affected by the rotation of said propeller in water to induce a flow of water therethrough, and the other opening being disposed to receive the force of water having a relative normal flow towards said housing to aid in inducing a flow of water through said ducts.

24. A combination with a marine motor pivotally movable in a substantially horizontal plane and having a water jacket, a propeller, of means whereby water forced rearwardly by said propeller will be forced through the water jacket, said last named means including a frame pivotally turnable relatively to the motor drive shaft for steering, which frame is provided with a duct or ducts disposed within the confines of its exterior surfaces and through which the circulating water flows, and said last named means being constant in respect to the propeller during the pivotal movement of the propeller.

25. The combination with a pivotally movable marine motor movable in a horizontal plane and comprising a water jacket and a propeller, of means whereby water forced rearwardly by said propeller will be forced through said jacket, said means comprising a water conductor having its intake end disposed rearwardly of the propeller and disposed within the confines of the exterior surfaces of a frame which is pivotally turnable relative to the motor shaft for steering, and wherein said last-named means remains constant in relation to the propeller during the movement of the propeller.

26. The combination with a pivoted outboard motor movable in substantially a horizontal plane and having a water jacket, a propeller having blades, of means whereby water forced rearwardly by the outer ends of the blades during the rotation of the propeller will be conveyed and forced through the water jacket, including a frame pivotally turnable relatively to the motor drive shaft for steering, and which frame is provided with a duct or ducts disposed within the confines of its exterior surfaces, and through which the circuating water flows, and wherein said last named means remains constant with relation to the propeller during the pivotal movement of the motor.

27. In combination with a pivoted marine motor movable in a substantially horizontal plane and having a water jacket, a propeller, an intake pipe connected to said water jacket, said intake pipe having its intake end disposed rearwardly of the propeller in a position whereby water will be forced therein by the propeller, said intake pipe being located within the confines of the exterior surfaces of a frame pivotally turnable relative to the motor drive shaft for steering, and said intake end of the pipe remaining constant in relation to the propeller during the pivotal movement of the motor.

28. In combination with a pivoted marine motor movable in substantially a horizontal plane and having a water jacket, of a propeller, of means whereby the current of water produced by the propeller will induce a flow of water through the water jacket, said means including a frame pivotally turnable relatively to the motor drive shaft for steering, which frame includes within its exterior surfaces a duct or ducts through which the circulating water flows, and said means remaining constant in relation to the propeller during the movement of the motor.

In testimony whereof I affix my signature.

LOUIS J. JOHNSON.